US012393596B2

(12) United States Patent
Cooley

(10) Patent No.: US 12,393,596 B2
(45) Date of Patent: *Aug. 19, 2025

(54) AUTOMATED SAMPLING OF QUERY RESULTS FOR TRAINING OF A QUERY ENGINE

(71) Applicant: Maplebear Inc., San Francisco, CA (US)

(72) Inventor: Nicholas Cooley, Oakland, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,055

(22) Filed: Feb. 28, 2024

(65) Prior Publication Data

US 2024/0202204 A1    Jun. 20, 2024

Related U.S. Application Data

(63) Continuation of application No. 17/826,162, filed on May 27, 2022, now Pat. No. 11,947,551.

(51) Int. Cl.
*G06F 16/24* (2019.01)
*G06F 16/2453* (2019.01)
*G06F 16/2455* (2019.01)
*G06F 16/2457* (2019.01)

(52) U.S. Cl.
CPC .. *G06F 16/24578* (2019.01); *G06F 16/24542* (2019.01); *G06F 16/2455* (2019.01)

(58) Field of Classification Search
CPC ......... G06F 16/24578; G06F 16/24542; G06F 16/2455; G06F 16/951; H04L 47/70

USPC .......................................... 707/723
See application file for complete search history.

(56) References Cited

U.S. PATENT DOCUMENTS

| 5,966,126 | A | 10/1999 | Szabo |
| 6,418,448 | B1 * | 7/2002 | Sarkar ................... G06F 16/972 |
| 6,601,061 | B1 * | 7/2003 | Holt ....................... G06F 16/951 |
| 6,952,755 | B2 * | 10/2005 | Karube ..................... G06F 9/52 711/147 |

(Continued)

OTHER PUBLICATIONS

PCT International Search Report and Written Opinion, PCT Application No. PCT/US22/49822, Feb. 22, 2023, 8 pages.

(Continued)

*Primary Examiner* — Hanh B Thai
(74) *Attorney, Agent, or Firm* — Fenwick & West LLP

(57) ABSTRACT

An online system may generate numerous search records in response to searches requested by users. The online system may use a specific way to sample the historical search records to reduce biases in sampling. For example, the online system retrieves historical query records associated with an item query engine. The set of historical query records includes a plurality of search phrases. A historical query record is associated with a search phrase and a list of items returned by the item query engine. The online system determines the search frequencies for the search phrases. The online system stratifies the historical query records into a plurality of bins according to the search frequencies of the search phrases. The online system samples the historical query records from the plurality of bins to collect a representative set of historical query records and outputs the representative set of historical query records for rating.

20 Claims, 9 Drawing Sheets

(56) References Cited

U.S. PATENT DOCUMENTS

| | | | |
|---|---|---|---|
| 7,448,022 B1* | 11/2008 | Ram | G06F 9/45504 717/120 |
| 7,602,834 B1* | 10/2009 | Giallorenzi | H04B 1/70752 375/150 |
| 7,725,496 B2* | 5/2010 | Paval | G06F 16/164 707/791 |
| 8,046,797 B2 | 10/2011 | Bentolila et al. | |
| 8,180,789 B1* | 5/2012 | Wasserman | G06F 16/242 707/766 |
| 8,521,526 B1 | 8/2013 | Lloyd et al. | |
| 8,554,769 B1* | 10/2013 | Thakur | G06F 16/951 707/735 |
| 8,751,283 B2* | 6/2014 | Bobak | G06Q 10/06 705/348 |
| 9,009,146 B1 | 4/2015 | Lopatenko et al. | |
| 9,208,233 B1* | 12/2015 | Tirumalareddy | G06F 16/951 |
| 9,378,065 B2* | 6/2016 | Shear | G06Q 10/0631 |
| 9,588,648 B2 | 3/2017 | Li | |
| 9,779,357 B1 | 10/2017 | Dabell | |
| 9,792,160 B2* | 10/2017 | Shear | G06F 9/50 |
| 9,904,579 B2* | 2/2018 | Shear | G06F 16/245 |
| 10,019,486 B2 | 7/2018 | Kephart et al. | |
| 10,075,384 B2* | 9/2018 | Shear | H04L 63/10 |
| 10,747,793 B2 | 8/2020 | Kataria et al. | |
| 10,997,244 B2* | 5/2021 | Russell | G06F 16/27 |
| 11,093,556 B2* | 8/2021 | Li | G06F 16/367 |
| 11,507,752 B1* | 11/2022 | Bhowmik | G06F 40/295 |
| 11,621,899 B1 | 4/2023 | Bettaiah et al. | |
| 2003/0208473 A1* | 11/2003 | Lennon | G06F 16/71 |
| 2004/0064549 A1* | 4/2004 | Brown | H04L 43/00 709/224 |
| 2004/0095998 A1* | 5/2004 | Luo | H04N 5/145 348/E5.066 |
| 2005/0114756 A1* | 5/2005 | Lehikoinen | G06F 16/9562 715/208 |
| 2007/0255696 A1* | 11/2007 | Desbarats | G06Q 30/02 |
| 2010/0202630 A1* | 8/2010 | Lindahl | H03G 5/165 381/103 |
| 2010/0318511 A1* | 12/2010 | Phan | G06F 16/9024 707/769 |
| 2011/0004621 A1* | 1/2011 | Kelley | G06F 16/21 707/769 |
| 2012/0317102 A1 | 12/2012 | Hu et al. | |
| 2013/0290316 A1 | 10/2013 | Bhatnagar et al. | |
| 2014/0026143 A1* | 1/2014 | Suzuki | G06F 9/52 718/104 |
| 2014/0052492 A1* | 2/2014 | Boss | G06Q 10/06375 705/7.25 |
| 2014/0074608 A1 | 3/2014 | Beck et al. | |
| 2014/0250115 A1 | 9/2014 | Yang | |
| 2014/0280193 A1 | 9/2014 | Cronin et al. | |
| 2014/0280952 A1* | 9/2014 | Shear | H04L 63/10 709/226 |
| 2015/0033305 A1* | 1/2015 | Shear | G06F 21/53 726/11 |
| 2015/0163099 A1* | 6/2015 | Huang | H04L 12/40013 370/242 |
| 2015/0310115 A1* | 10/2015 | Ryger | G06F 16/9535 707/708 |
| 2016/0019338 A1* | 1/2016 | Chudova | G16B 30/10 702/20 |
| 2016/0034305 A1* | 2/2016 | Shear | G06F 16/285 707/722 |
| 2016/0217509 A1 | 7/2016 | Eggleston et al. | |
| 2016/0266939 A1* | 9/2016 | Shear | G06F 16/24575 |
| 2016/0299982 A1* | 10/2016 | Bhave | G06F 16/3337 |
| 2017/0180910 A1* | 6/2017 | Foti | H04W 4/70 |
| 2017/0193579 A1* | 7/2017 | Goldberg | G06Q 30/0201 |
| 2017/0235816 A1 | 8/2017 | Livshits et al. | |
| 2017/0242893 A1 | 8/2017 | Kephart et al. | |
| 2018/0024901 A1 | 1/2018 | Tankersley et al. | |
| 2018/0089281 A1* | 3/2018 | Li | G06F 16/9538 |
| 2018/0232461 A1 | 8/2018 | Fu | |
| 2018/0278710 A1* | 9/2018 | Sun | H04L 67/565 |
| 2018/0315145 A1 | 11/2018 | Darnell et al. | |
| 2018/0357299 A1 | 12/2018 | Miranda et al. | |
| 2019/0018904 A1* | 1/2019 | Russell | G06F 16/9024 |
| 2019/0130050 A1 | 5/2019 | Haas et al. | |
| 2019/0143999 A1* | 5/2019 | Tsukidate | B60R 16/02 701/29.2 |
| 2020/0192903 A1 | 6/2020 | Bansal et al. | |
| 2020/0233893 A1 | 7/2020 | He et al. | |
| 2020/0250197 A1 | 8/2020 | Yang et al. | |
| 2020/0334263 A1 | 10/2020 | Bansal et al. | |
| 2021/0081848 A1 | 3/2021 | Polleri et al. | |
| 2021/0089531 A1 | 3/2021 | Hu et al. | |
| 2021/0256068 A1* | 8/2021 | Larlus | G06F 16/90332 |
| 2022/0050818 A1 | 2/2022 | Li et al. | |
| 2022/0121884 A1* | 4/2022 | Zadeh | G06N 3/006 |
| 2022/0122721 A1 | 4/2022 | Alberico | |
| 2023/0385911 A1* | 11/2023 | Weintraub | G06Q 30/0633 |

OTHER PUBLICATIONS

United States Office Action, U.S. Appl. No. 17/826,162, filed Jun. 8, 2023, 21 pages.

* cited by examiner

AUTOMATED SAMPLING OF QUERY RESULTS FOR TRAINING OF A QUERY ENGINE

CROSS REFERENCE TO RELATED APPLICATION

This application is a continuation of U.S. Application Ser. No. 17/826,162, filed May 27, 2022, which is incorporated by reference in its entirety.

FIELD

This disclosure relates generally to training of a query search engine for a database and, more specifically, to sampling historical query records to assess training quality.

BACKGROUND

Delivering accurate, relevant and sometimes user-tailored data to users is often a challenging task for any online system, particularly ones with large databases. A large-scale database that serves millions of users often includes numerous data records and items and relies heavily on a query engine to return relevant and ranked results to the users. The performance of the query engine could significantly affect the user experience of an online system. The data retrieval task is even more complex in a database where the data is relatively dynamic. For example, in an inventory offering or management online system, the item availability and timing factors could affect the returned result generated by an item query engine. Additionally, result quality can vary subjectively from user to user. Since the query results in an item query engine could change based on various conditions of the inventory, evaluating the performance of such an item query engine is uniquely challenging.

SUMMARY

In some embodiments, a process of sampling historical query records for an item query engine is disclosed. The process may reduce bias in the sampling. In a large-scale online system, thousands or even millions of searches are performed by the online system. It is often infeasible to use all of the query records to evaluate the performance of the query engine. As such, an online system may sample the query records to generate a representative set. In an item query engine for an online system such as an inventory offering or management system, user searches could be skewed heavily on certain common items, such as common daily products. Hence, certain search phrases may predominate among the historical query records. A purely random sampling of the historical query records may generate bias in favor of the common search phrases because the randomly sampled collection will include a majority of records that are associated with those common search phrases.

In some embodiments, an online system may retrieve a set of historical query records associated with an item query engine. The set of historical query records may include a plurality of search phrases. A historical query record is associated with a search phrase and a list of items returned by the item query engine. The online system may determine the search frequencies of the search phrases among the historical query records. The online system may stratify the set of historical query records into a plurality of bins according to the search frequencies of the search phrases. A bin corresponds to a subset of historical query records whose search phrases' search frequencies are within a range. The online system may sample the historical query records from the plurality of bins to collect a representative set of historical query records. The online system may output the representative set of historical query records for rating. The rated historical query records may be used to evaluate the performance of the engine, conduct additional training, and refine the item query engine.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Overview

Figure 1:
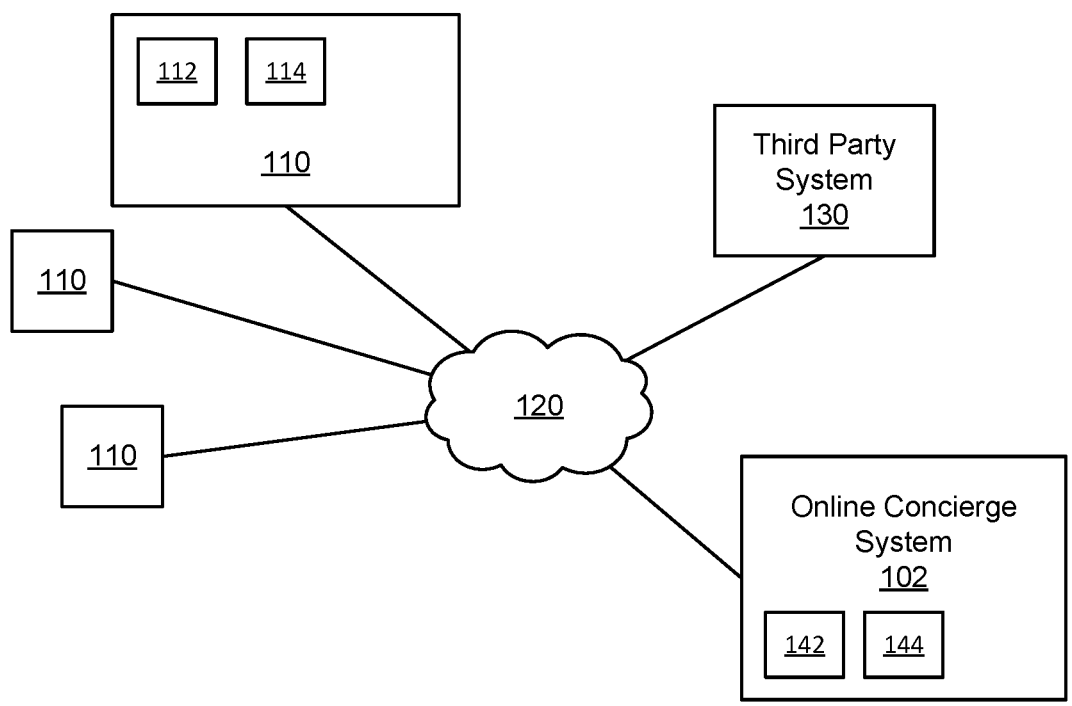
FIG. 1 is a block diagram of a system environment in which an online system, such an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one or more embodiments, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality and various processes further described in this disclosure, for example in conjunction with FIGS. 2, 6 and 8. For example, the memory 144 has instructions encoded thereon that, when executed by the processor 142, cause the processor 142 to stratify historical query records of an item query engine according to the search frequencies of the search phrases in the queries and sample the historical query records accordingly to generate an unbiased representative set of historical query records for training of the item query engine. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-9, and may include specific computing components such as processors, memories, communication interfaces, and/or the like.

System Overview

Figure 2:
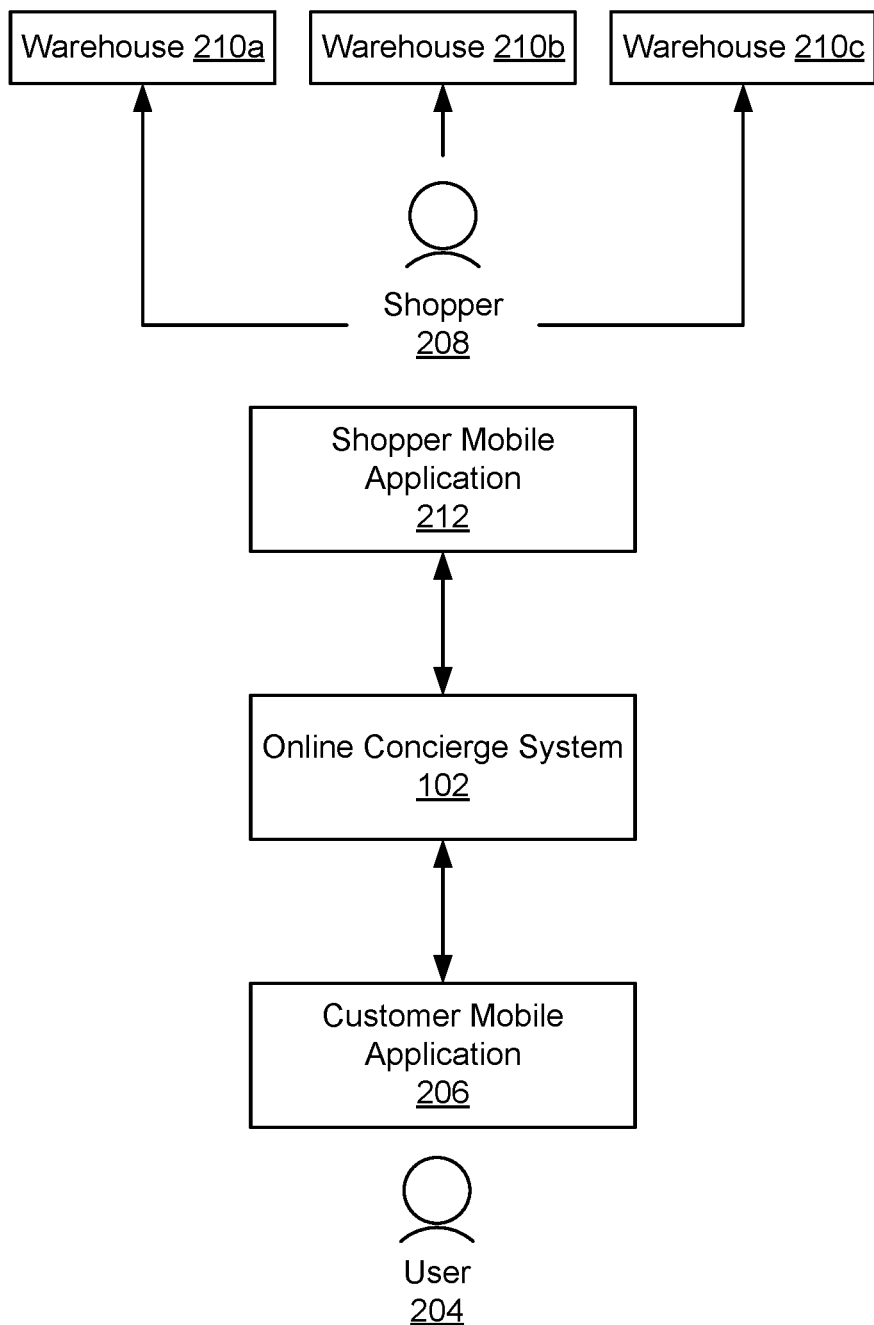
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one or more embodiments, shoppers 208 make use of a shopper mobile application 212 which is configured to interact with the online concierge system 102.

Figure 3:
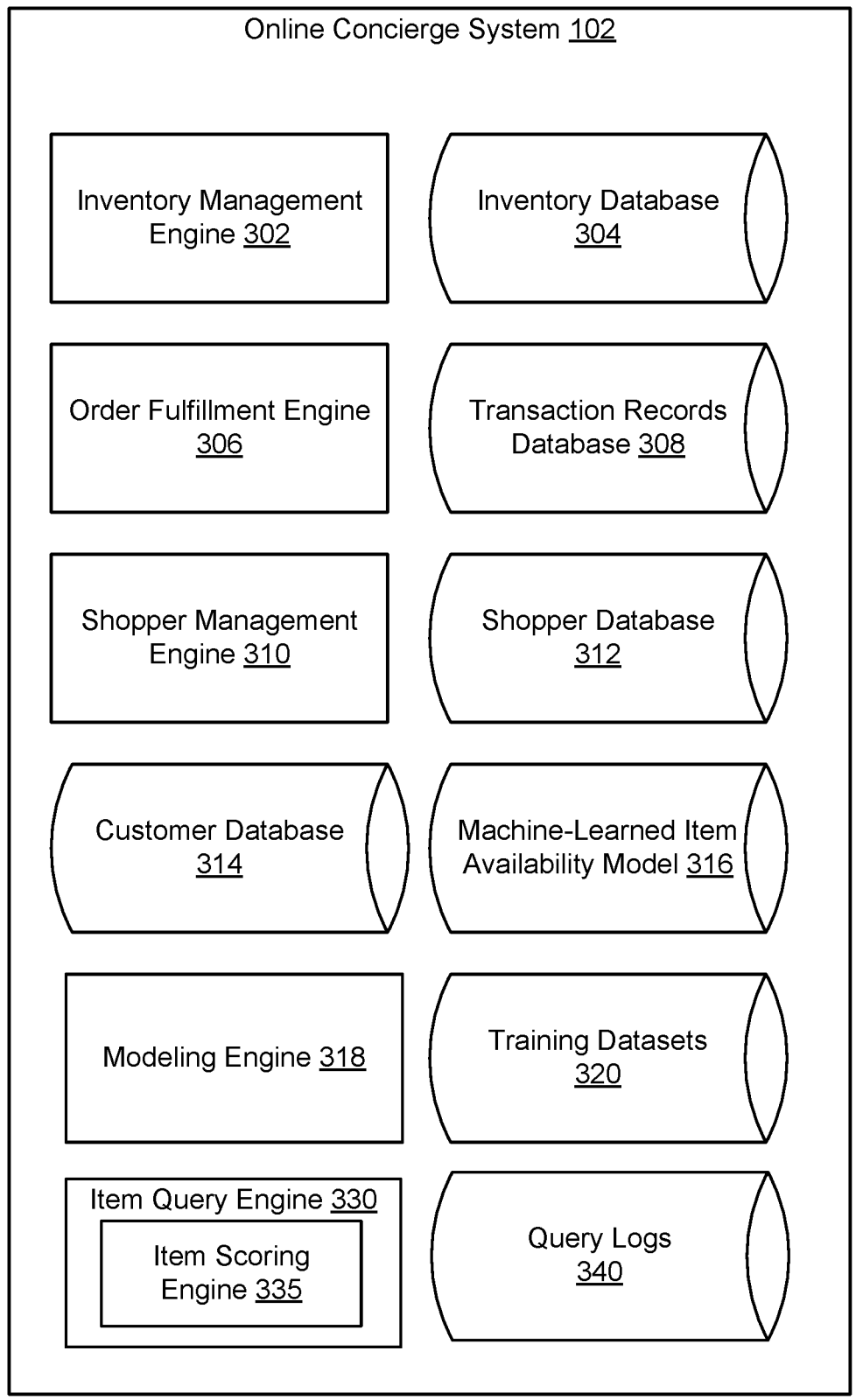
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210, different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one or more embodiments, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one or more embodiments, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one or more embodiments, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

The item query engine 330 receives search queries from users and selects items to be presented as search results to users. Items and products may be used interchangeably in this disclosure. The item query engine 330 uses one or more machine learning models that are trained to select, score, and rank items. The item query engine 330 may be applied to different warehouses with different item selections and availabilities. In one or more embodiments, the item query engine 330 receives a search phrase from a user that includes one or more keywords. The item query engine 330 selects one or more items that match the search phrase. The item query engine 330 consults machine-learned item availability model 316 to determine the availabilities of those items. For available items, the item query engine 330 ranks and scores the items based on different criteria, such as relevancy, diversity, and whether an item is sponsored. The item query engine 330 in turn produces the result to a graphical user interface for the user to select the items. The item query engine 330 is discussed in further detail below in the context of FIG. 5. U.S. patent application Ser. No. 17/550,950, entitled Context-Based Content-Scoring for an Online Concierge System, filed on Dec. 14, 2021, is incorporated by reference herein in its entirety for all purposes.

Query logs 340 are stored in a database that saves historical query records of the online concierge system 102 for various warehouses 210. A query log 340 may include a number of historical query records. A historical query record may be a record that documents an actual search requested by a user, time of the search, identifier of the warehouse 210 and the actual search result returned by the item query engine 330. Each historical query record may be associated with a unique search identifier and a timestamp.

Customer Mobile Application

Figure 4A:
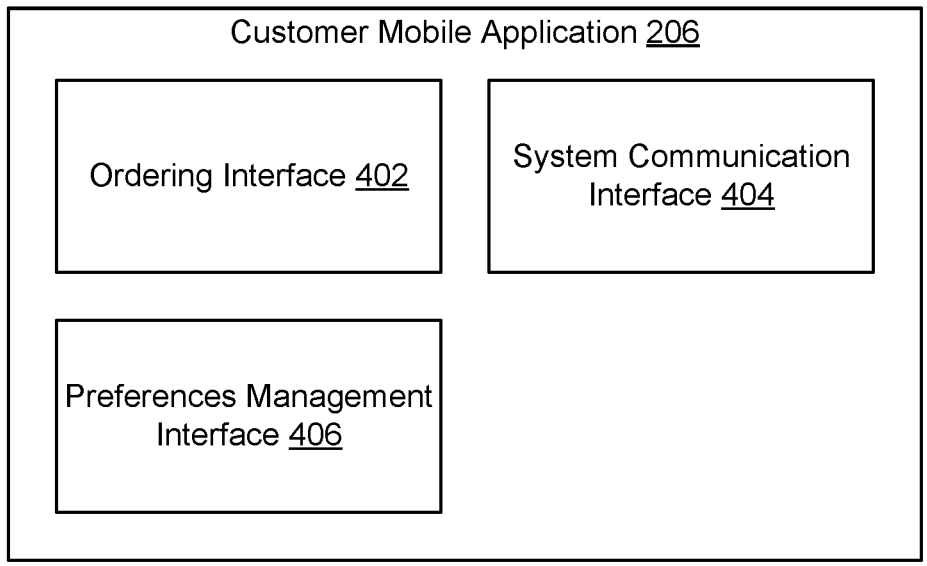
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 102. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
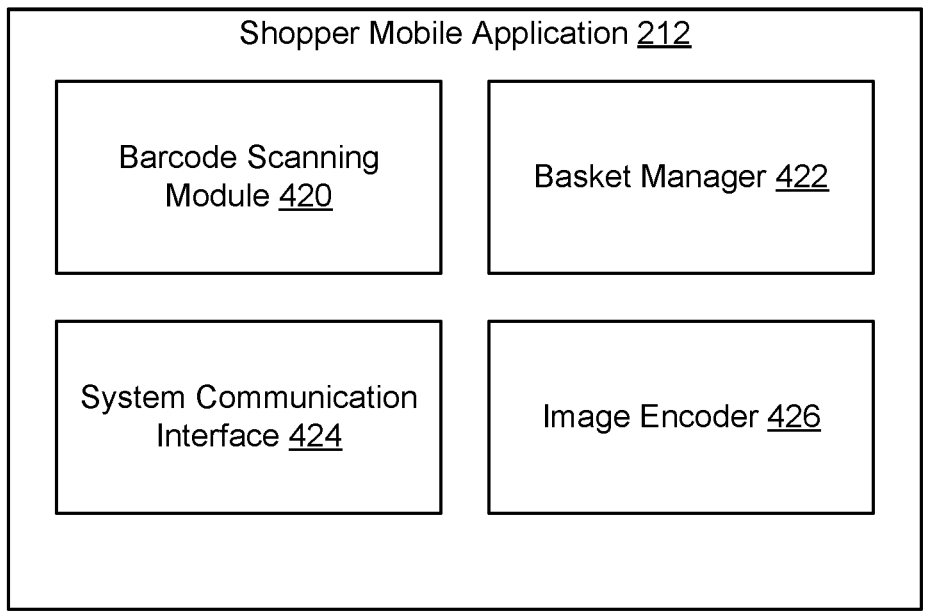
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one or more embodiments, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Example Item Query Engine

Figure 5:
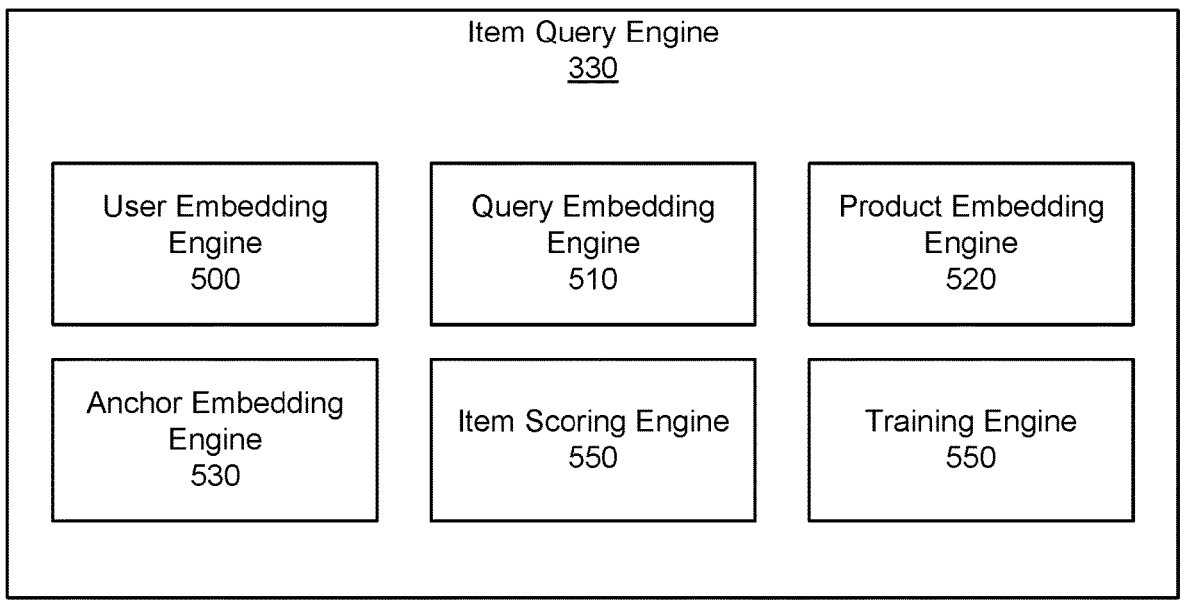
FIG. 5 is a block diagram of an item query engine, according to some embodiments.

FIG. 5 is a block diagram for an item query engine 330, according to some embodiments. In one or more embodiments, the item query engine 330 may include a user embedding engine 500, a query embedding engine 510, an item embedding engine 520, an anchor embedding engine 530, an item scoring engine 540, and a training engine 550. Alternative embodiments may include more, fewer, or different components from those illustrated in FIG. 5, and the functionality of each component may be divided between the components differently than described in the description below. Additionally, each component may perform their respective functionalities in response to a request from a human, or automatically without human intervention.

The user embedding engine 500 generates user embeddings for users using the online concierge system 102. Each user embedding is an embedding vector that describes characteristics or features about an associated user. The user embedding engine 500 generates user embeddings for a user based on user data. User data is data that describes characteristics about a user that may be relevant for determining the relevance of a product to a user, and such data may be collected in accordance with one or more privacy policies and/or applicable privacy laws and/or regulations. For example, user data may include one or more of the user's name, the user's location, the user's stated preferences, the user's previously ordered products, the user's frequency of placing orders, which retailers the user orders from, a typical order cost for the user, or a browsing history of the user on the customer mobile application 106 or other applications the user may use. User data may include raw data, preprocessed data, or feature sets describing information about a user. In some embodiments, the user embedding engine 500 collects user data from the user database 314. The user embedding engine 500 may store generated user embeddings in the user database 314 and associate, within the user database 314, each user embedding with a user that the user embedding describes.

In some embodiments, the user embedding engine 500 uses one or more user models to generate user embeddings. User models are machine learning models (e.g., neural networks) that are trained to generate user embeddings based on user data. The user embedding engine 500 can also retrieve a user embedding associated with a specified user from the user database 314.

The query embedding engine 510 generates a query embedding for the user's search query. A query embedding is an embedding vector that describes features of the user's search query. The query embedding engine generates a query embedding based on search query data. Query data is data describing a user's search query for the online concierge system 102. For example, query data may include one or more of search phrases, previous searches by the user within the user's session, or search queries conducted by other users of the online concierge system 102. Query data may also include context data describing the context in which the user has queried the online concierge system 102 for products. For example, the context data may include one or more of how long the user's session with the online concierge system 102 has lasted, the products that are currently in the user's selected products list, or other products with which the user has interacted during the session. Query data may include raw data, preprocessed data, or feature sets describing information about a query or context. Any and/or all of this data may be collected in accordance with one or more privacy policies and/or applicable privacy laws and/or regulations.

The query embedding engine 510 uses one or more query embedding models to generate a query embedding. Query embedding models are machine learning models (e.g., neural networks) that are trained to generate query embeddings based on search phrases.

The item embedding engine 520 generates an item embedding for items being evaluated by the item query engine 330. An item embedding is an embedding vector that describes an item. The item embeddings may be associated with specific items stored in the inventory database 304. For example, each brand of a product may have an individual item embedding, or products may have different item embeddings for each retailer that sells the product. Alternatively, each item embedding may be associated with a generic product, and each generic product may be associated with specific products that are similar or substitutes of each other. For example, the inventory database 304 may store an item embedding for the generic product "milk", and the specific products of "Moo Moo 3% Milk" and "Greener Pastures Organic Whole Milk" may both be associated with the item embedding for "milk." In some embodiments, item embeddings are stored in the inventory database 304.

The item embedding engine 520 uses one or more item embedding models to generate an item embedding based on product data. An item embedding model is one or more machine learning models (e.g., neural networks) that are trained to generate item embeddings based on product data. Item data is data that describes characteristics about items available for purchase using the online concierge system 102. For example, item data may include one or more of a product name, a product type, whether a product is associated with a recipe, retailers that offer the product for sale, the shelf-life of a product, identifiers for other products with which the product is commonly purchased, a popularity of the product, the availability of a product, the price of a product, any restrictions that may be in place on the purchase of the product, whether the product is a food item, a frequency with which the product is purchased using the online concierge system 102, other products which the product has been or may be presented, or an expense incurred by the online concierge system 102 to provide the product to the user. Product data may include raw data, preprocessed data, or feature sets describing information about a product.

The anchor embedding engine 530 generates anchor embeddings based on user embeddings and query embeddings. An anchor embedding is an embedding of the same dimension and in the same embedding space as an item embedding. The anchor embedding can therefore be compared to item embeddings to determine products that would be relevant to present to a user in response to a search query. The anchor embedding engine 530 may use one or more anchor embedding models to generate an anchor embedding. Anchor embedding models are machine learning models (e.g., neural networks) that are trained to generate anchor embeddings based on user embeddings and query embeddings.

The item scoring engine 540 generates item scores for items. An item score is a score for a product that indicates the product's affinity for being presented to a user in response to a search query from the user. An item score may represent a likelihood that the user will interact with the product if the product is presented to the user or may represent some expected value based on the likelihood of user interaction and the value of the user's interaction with the product. The item scoring engine 540 generates item scores for products based on a comparison of an anchor embedding with a set of item embeddings associated with a set of candidate products. The set of candidate products can include all products available on the online concierge system 102 or a subset of the products. The anchor embedding is generated by the anchor embedding engine 530 based on a query embedding for the search query and a user embedding for the user who submitted the search query. The item scoring engine 540 may compare the anchor embedding with the set of item embeddings by calculating a Euclidean distance, a cosine distance, or a dot product of the anchor embedding and each item embedding.

Additionally, the item scoring engine 540 may use a machine learning model (e.g., a neural network) trained to generate item scores for products based on item embeddings associated with the products and an anchor embedding. In some embodiments, the machine learning model generates item scores based on comparisons of item embeddings for the set of candidate products with an anchor embedding.

The online concierge system 102 may generate various embedding vectors using various machine learning models and techniques. In some embodiments, the words of the textual content are mapped into vectors using different embedding techniques such as term frequency-inverse document frequency (TF-IDF) vectorization, continuous big-of-words (CBOW) model, and/or skip-gram model. The mapping process may be conducted through a supervised or unsupervised neural network. The generation of the word vectors is based on aggregated word-to-word co-occurrence statistics from a corpus. A corpus may be selected from a collection of open-source data sources, a collection of textual content of data specific to the online concierge system 102 and may additionally include other sources of text from books, publications, online articles, advertisements, etc. to provide additional training to a neural network that performs the word vector generation. Each word vector generated corresponds to a word and represents the semantic correlation, similarity, and difference of the word with respect to other words in the corpus. Techniques such as TF-IDF vectorization may be used to penalize the weight of common words such as articles, prepositions, and conjunctions that carry little significance in defining semantic characteristics of a text.

The generation of an embedding of a collection of words or data may be achieved in different ways. In one or more embodiments, after single words are converted into word vectors, an average of all of the word vectors can be calculated to generate a common vector that has a specific direction and magnitude. The average can be a simple average or a weighted average. For example, the weighted average can be calculated based on the number of occurrences of a word in the survey response. Techniques such as TF-IDF vectorization may be used to reduce the weight of common words that do not carry much semantic significance. The averaged vector represents an overall semantic characteristic of the textual content of the survey response in the form of a mathematical vector. Such an averaged vector is served as the embedding of the collection of words or data. In another case, instead of taking the average of all word vectors, a certain number (e.g. ten) of top semantically significant word vectors are selected to generate an averaged vector.

In another embodiment, the generation of an embedding for a collection of words or data may be carried out through another neural network. The neural network can be a deep neural network that includes an input layer, an output layer, and one or more hidden intermediate layers. Each layer includes one or more nodes that are connected to other layers. A layer receives inputs from a preceding layer and produces outputs for a succeeding layer. In one case earlier layers (e.g., layers closer to the input layer) are configured to capture syntactic meanings of the textual content, while later layers (i.e. layers closer to the output layer) are configured to capture semantic meanings of the textual content. The layers of the neural network perform recognition of syntactic and/or semantic features by convolution, clustering, classification, matching, and/or the like. The neural network is configured to receive the textual content. The neural network is configured to output a vector that represents the semantic characteristic of the textual content of a collection of words or data after the input is analyzed through multiple layers and nodes. The output vector represents the semantic characteristic of the textual content and may be served as the output embedding.

The training engine 550 evaluates the performance of the machine learning models used by the item query engine 330 so that the machine learning models can be trained to perform more effectively. For example, the training engine 512 may evaluate the performance of user embedding models, query embedding models, item embedding models, or anchor embedding models. Periodically, historical query records may also be sampled and rated manually or according to one or more metrics. The rated historical query records may also be used to further train one or more machine learning models in the item query engine 330. The periodic sampling of query records and training of item query engine 330 are further discussed in FIG. 6 through FIG. 9.

In some embodiments, the training engine 550 uses one or more loss functions to train machine learning models used by the item query engine 330. A loss function may improve the machine learning models used by the item query engine 330 such that the item query engine 330 generates item scores for products representing an affinity of the products being presented to a user in response to a search query from the user. In some embodiments, the training engine 550 backpropagates the loss function through the anchor embedding models, the item embedding models, the query embedding models, and the user embedding models. The training engine 550 also may apply a machine learning model to the anchor embedding and a set of item embeddings to train the machine learning models used by the item query engine 330.

In some embodiments, the training engine 550 uses a loss function that is based on the triplet loss function. The modified triplet loss function may assign different weights to different types of interactions that are considered positive examples based on a hierarchy of interactions. The hierarchy of interactions may reflect that certain interactions are more valuable to the online concierge system 102 than other interactions. For example, a purchase interaction (e.g., where a user purchases a product) may be more valuable than a select interaction (e.g., where the user adds the product to a selected products list), which itself may be more valuable than a click interaction (e.g., where the user selects a product to see more information about the product). The training engine 550 may use weights in a modified triplet loss function that emphasizes minimizing the distance from higher tier positive examples than from lower tier positive examples. For example, the training engine may use the following as a loss function:

$$L = \sum_{i=1}^{M} \max(\delta_{i_1}\beta_1 dist(AE, PE_{P_i}) + \\ \ldots + \delta_{i_n}\beta_n dist(AE, PE_{P_i}) - dist(AE, PE_{N_i}) + \alpha, 0)$$

For this example loss function, AE is an anchor embedding for a user who submitted a search query, $PE_P$ is an item embedding of a positive training example (e.g., where the user interacted with a presented product), and $PE_N$ is an item embedding of a negative training example (e.g., where the user did not interact with a presented product). The function dist is a function that computes the distance between two embeddings (e.g., the Euclidean distance). In the example loss function, there are n types of positive interactions that a user can take with regards to a product and those different types of interactions are weighted using weights $\beta_1 \ldots \beta_n$. These weights can assign greater value to more valuable interactions by increasing the loss value of a distance between the anchor embedding and the positive example. Additionally, the example loss function uses indicator variables $\delta_1 \ldots \delta_n$ to apply the correct weight $\beta$ to the positive example. The only indicator variable with a non-zero value is the indicator variable that corresponds to the type of interaction represented by the positive example. Furthermore, M is the number of search examples used to train the machine learning models and $\alpha$ is a hyperparameter controlling the margin in the example loss function.

Example Item Query and Engine Training

Figure 6:
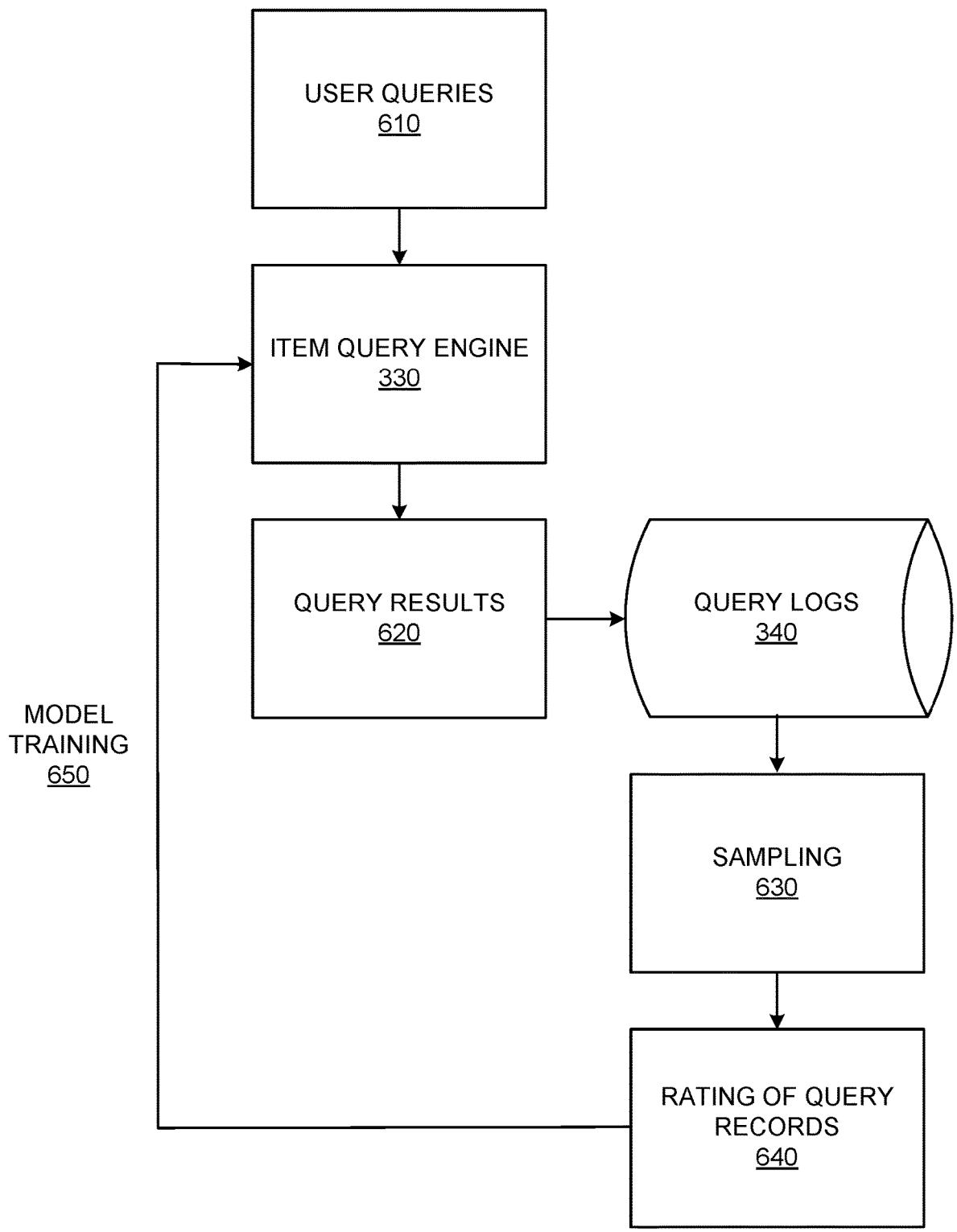
FIG. 6 is a block diagram illustrating an example process of generating user item query results and training of the item query engine, according to one or more embodiments.

FIG. 6 is a block diagram illustrating an example overall process of generating item query results and training of the item query engine 330, according to one or more embodiments. In various embodiments, the process may include different or additional steps than those described in conjunction with FIG. 6. Further, in some embodiments, the steps of the process may be performed in different orders than the order described in conjunction with FIG. 6. The process described in conjunction with FIG. 6 may be carried out by the online concierge system 102, while in other embodiments, the steps of the method are performed by any online system capable of generating query results in response to a user query.

In one or more embodiments, various end users may use the online concierge system 102 to search for various products in different warehouses 210. A user query 610 may be a search phrase that includes one or more keywords. A user may enter the search phrase via a user interface such as the ordering interface 402 in a CMA 206. The online concierge system 102 receives the search phrase and uses the item query engine 330 to generate a query result 620 for the user.

In various embodiments, the item query engine 330 may generate a query result 620 based on various factors. An example of the item query engine 330 and how it operates is further described above in association with FIG. 5. In some embodiments, a query result may include a list of items that are ranked for the positions for display. The generation of a query result may include a search phase and a rank phase. In the search phase, a search may be conducted for a collection of items in warehouse 210 that are relevant to the search phase. In some embodiments, a warehouse 210 may maintain a real-time list of inventory items that are available for purchase. In such a case, the item query engine 330 may remove unavailable items. In some embodiments, the online concierge system 102 may rely on the machine-learned item availability model 316 to predict whether an item is available. In such a case, the availability of an item may be one of the factors that determines whether an item is selected and how it is ranked. Other factors may also be used to select and rank the items, such as the popularity of the items, historical preference of the user, historical purchase of the user, profitability of items, expiration dates, diversity of items, etc. In some embodiments, a selection factor may also be whether an item is sponsored (e.g., an advertised item). In some instances, an item may be sponsored by a grocery store or other retailer using the service of the online concierge system 102 and/or by suppliers and/or manufacturers (e.g., a consumer packaged good company) that want to promote the item.

The item query engine 330 may also rank the selected items to determine how the items are arranged in the user interface to be displayed to the user. The ranking may also be based on the various factors described above. Items that are ranked higher are displayed at more prominent positions in the query results, such as at the top of the results. In some embodiments, one or more positions may be reserved for certain types of items. For example, in some embodiments, certain positions may be reserved for sponsored items and may each be associated with a different bid rate for an item to be placed at such a reserved position.

The query results 620 may be timestamped and each assigned with a unique search identifier. The query results 620 that have occurred at the online concierge system 102 may be referred to as historical query records. The historical query records may be stored in one or more query logs 340. A historical query record is associated with a search phrase and a list of items returned by the item query engine 330. In some embodiments, the list may be ranked and the ranking is also saved as part of the historical query record. The query logs 340 may be stored in a database for future retrieval. An example of a query log is discussed in FIG. 7.

In some embodiments, the online concierge system 102 may automatically and periodically sample 630 a representative set of historical query records for the rating of the query results as a part of a process of training and evaluating the performance of the item query engine 330. In some embodiments, the online concierge system 102 receives numerous search requests from different users in various warehouses 210. As such, the online concierge system 102 uses one or more algorithms to sample some of the historical query records for further evaluation. The sampling process 630 described in this disclosure may reduce the bias of the samples and improve the performance of the item query engine 330.

For example, in one or more embodiments, the online concierge system 102 conducts the sampling 630 of the historical query records based on the search frequencies of the search phrases. If the historical query records are sampled randomly based on the search identifiers, oftentimes frequently searched phrases such as "milk," "apple," etc. may be overly represented in the sampled result because the historical query records in a query log 340 may be predominantly filled with historical query records that are associated with those search phrases. In some embodiments, the online concierge system 102 may determine the search frequencies of the search phrases among the historical query records. The online concierge system 102 may stratify the historical query records into a plurality of bins according to the search frequencies of the search phrases. For example, a bin corresponds to a subset of historical query records whose search phrases' search frequencies are within a range. Each bin may have a different range than another bin. In turn, the online concierge system 102 samples the historical query records from the plurality of bins to collect a representative set of historical query records. The sampling process 630 is further described in FIGS. 8 and 9.

The online concierge system 102 outputs the representative set of historical query records for rating 640 of the historical query records. The rating of the historical query records may be conducted by the online concierge system 102 or by another system. For example, the online concierge system 102 may transmit representative sets of historical query records to a third party system (e.g., a rating agent) through an API. In some embodiments, the online concierge system 102 periodically samples (e.g., every week, every N days, etc.) the historical query records and collect the sampled results for rating.

In various embodiments, the rating may be performed in various ways, such as automatically or manually (e.g., manually reviewed by a person who evaluates the quality of the query result). The online concierge system 102 may define one or more metrics whose values are used to represent the quality of the query results. Example metrics may include relevancy, diversity, user preference, conversion rate (e.g., user click rate, user purchase rate) and other statistically or not, formula-based or not, subjective or objective, manually assigned or automatically assigned, quantifiable or not, metrics. In some embodiments, some of the evaluations may be automatically determined by the online concierge system 102 (e.g., past conversion rates of the item in a query result) while other evaluations may be conducted by a third-party rater that performs manual rating. In some embodiment, a metric may be a composite metric that combines one or more abovementioned metrics through various suitable ways, such as weighted average or other statistics. In some embodiments, a composite metric may also take the form of a feature vector that may include multiple dimensions, each dimension corresponding to an individual metric.

The rated historical query records may be used as training samples for the training of one or more machine learning models in the item query engine 330 in model training 650. For example, the metric values of the rated historical query records may be used as labels of the training samples in training a supervised learning model. In one or more embodiments, a quality metric value may be assigned to each of the historical query records in the representative set that is sampled. The representative set is used to train the item query engine 330 (e.g., one or more machine learning models), such as using a supervised learning technique. For example, the online concierge system 102 uses the item query engine 330 to generate, in a forward propagation of the training, query results using the search phrases of the historical query records in the representative set. The online concierge system 102 compares the query results to the historical query records and the metric values. The online concierge system 102 in turn adjusts, in a back propagation of the training, parameters of the item query engine 330 based on the comparison. For example, the item query engine 330 may be adjusted (automatically, e.g., by the online concierge system 102) such that it generates more query results with higher quality metric values and fewer query results that have lower quality metric values. Machine learning techniques such as stochastic gradient descent may be used in adjusting the parameters in the back propagation. The forward propagation and back propagation may be repeated iteratively until the training is completed, such as when the machine learning model converges or after a predetermined number of iterations.

Example Query Log

Figure 7:
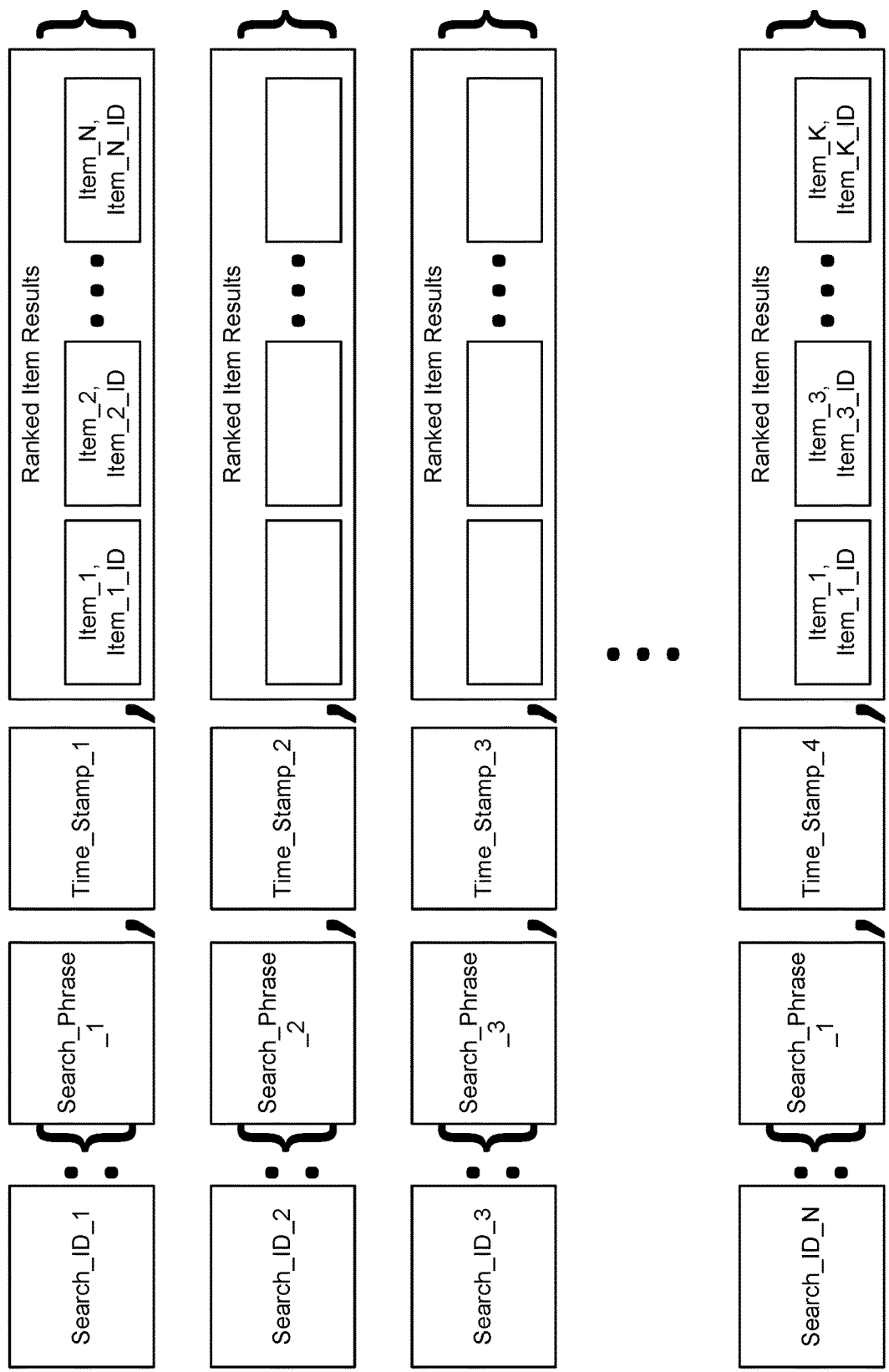
FIG. 7 is a conceptual diagram illustrating an example query log that includes a number of historical query records, according to one or more embodiments.

FIG. 7 is a conceptual diagram illustrating an example query log that includes a number of historical query records, according to one or more embodiments. The data structure and the fields in the query log are for illustration only. In various embodiments, a query log may be represented in a different format and with different data fields. Also, the entry in the query log may include additional data fields that are not displayed in FIG. 7. A query log may be specific to a warehouse 210 or a physical store. Another warehouse 210 or another physical store may have another query log.

In FIG. 7, the example query log includes multiple entries. Each entry is a historical query record that may be uniquely identified by a search identifier (Search_ID). The entry may take the form of key-value pairs where the key is the search identifier and the value includes a list of data fields that record the nature of the historical query record. The data fields may include the search phrase, the time stamp of when the query occurred, and the item results. Each historical query record is associated with a search phrase that includes one or more keywords. However, the search phrases are not unique among the historical query records. For example, in the illustration of FIG. 7, the historical query record with the Search_ID_1 and the historical query record with the Search_ID_N have the same search phrase. The online concierge system 102 may calculate the search frequencies of different search phrases used in various historical query records in a period of time. Some search phrases are more frequently searched by different users than other phrases.

The item results are records of actual items that are selected and ranked by the item query engine 330. The item results may be a ranked list of items and the items' corresponding unique identifiers. Since the item query engine 330 conducts searches based on various factors and some of those factors may be user-specific or time-sensitive, the item results are often different even for the same search phrase. For example, in the illustration shown in FIG. 7, while the historical query record with the Search_ID_1 and the historical query record with the Search_ID_N have the same search phrase, the ranked item results for the two query results are different.

Example Query Record Sampling

Figure 8:
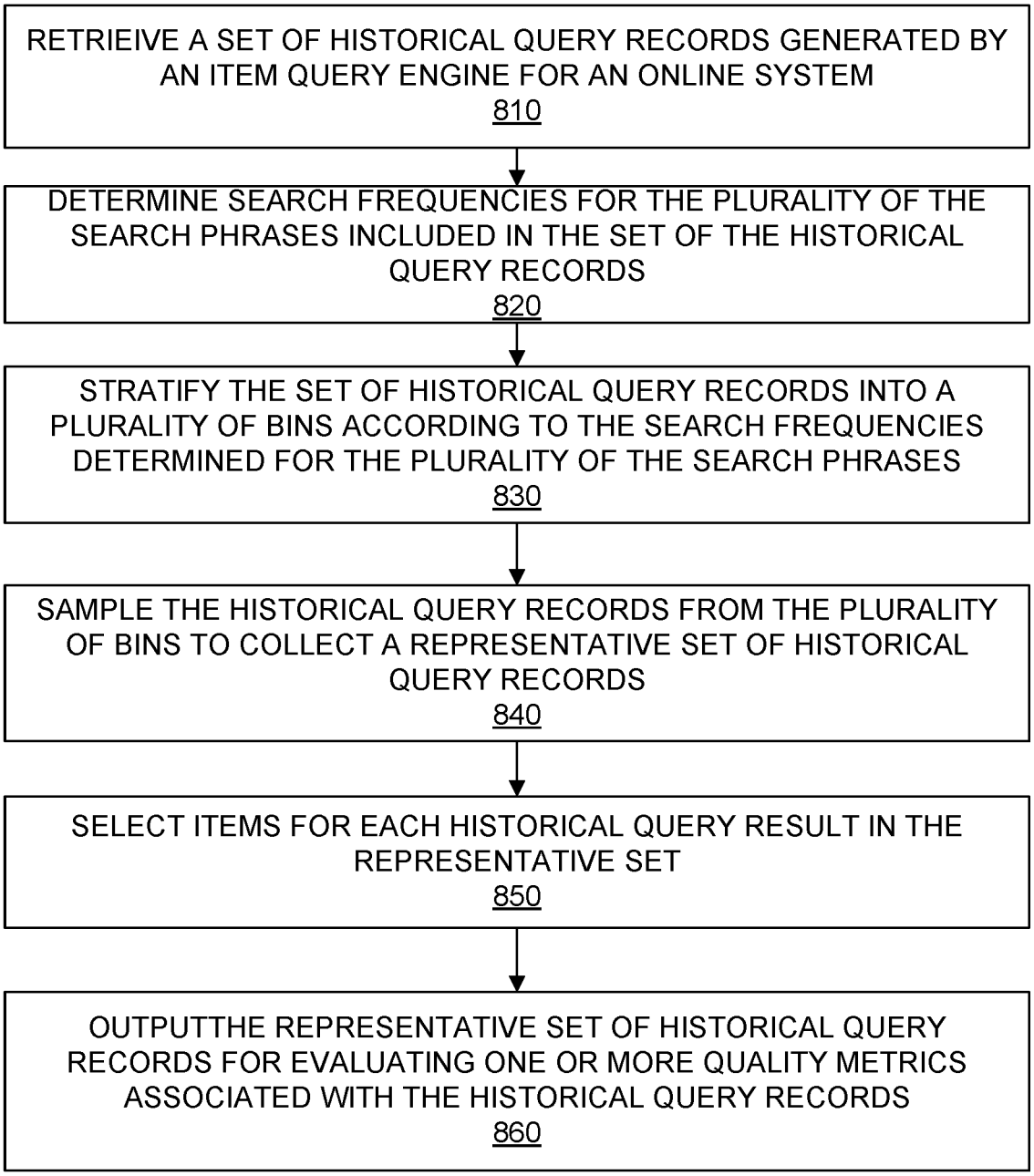
FIG. 8 is a flowchart depicting an example process for sampling historical query records, according to one or more embodiments.

FIG. 8 is a flowchart depicting an example process 800 for sampling historical query records, according to one or more embodiments. In various embodiments, the process 800 includes different or additional steps than those described in conjunction with FIG. 8. Further, in some embodiments, the steps of the process 800 may be performed in different orders than the order described in conjunction with FIG. 8. The process 800 may be carried out by the online concierge system 102 in various embodiments. In other embodiments, the steps of the process 800 are performed by any suitable online system. While the process 800 is described to be used in association with an item query engine, the process 800 may also be used for other query engines that are not used for item selection, such as a document retrieval engine, a search engine, and a literature search engine, etc.

In some embodiments, the online concierge system 102 retrieves 810 a set of historical query records associated with an item query engine 330. For example, the online concierge system 102 may retrieve the historical query records in a query log 340. The set of historical query records includes a plurality of search phrases. A historical query record is associated with a search phrase and a list of items returned by the item query engine 330, as illustrated in FIG. 7. In some embodiments, the set of historical query records may be retrieved from query records that are within a predetermined number of days old. For example, the process 800 may be performed periodically (e.g., every week, every N days) to collect new sets of representative historical query records that may be used as training samples to further train or reinforce one or more machine learning models used in the item query engine 330 periodically.

The online concierge system 102 determines 820 search frequencies for the search phrases included in the set of the historical query records. The online concierge system 102 may sort the historical query records by search frequencies of the search phrases associated with the historical query records. For example, there may be historical query records that share the same search phrases, particularly those for common search phrases such as "milk," "steak," etc. The online concierge system 102 may sort each historical query record based on how common the search phrase associated with the query record is used in other historical query records in a given period of time. For example, the search frequency for a search phrase may correspond to the number of historical query records that have the same search phrase.

In some embodiments, the historical query records may first be classified into two or more groups. For some rare search phrases, each of them may have only one or a handful of historical query records that have the same search phrase. The historical query records with those rare search phrases may be referred to as "singleton" query records. The online concierge system 102 may define a threshold search frequency (e.g., smaller or equal to 1, 2, 3, etc.). The historical query records with search phrases whose search frequencies are under the threshold may be classified as singleton queries while other historical query records with more common search phrases may be classified as "non-singleton" or normal queries. While two groups (singleton or non-singleton) are given as examples here, the historical query records may be classified into multiple groups. For example, multiple search frequency threshold levels may be defined. Regardless of whether a historical query record is singleton or not or is classified or not, the historical query records in the set of a given period may be sorted by the search frequencies of the search phrases.

The online concierge system 102 stratifies 830 the set of historical query records into a plurality of bins according to the search frequencies of the search phrases. A bin corresponds to a subset of historical query records whose search phrases' search frequencies are within a range. A bin size may refer to the total number of bins used. A bin size for a particular group may be the total number of bins used in the group. In some embodiments, before stratifying the historical query records into bins, the historical query records are classified as groups based on whether the historical query records are singleton or not (or further classified into multiple groups). The singleton group and the non-singleton group may have the same or different bin sizes (e.g., different numbers of bins within a group).

The overall bin size or bin sizes for different groups may be predetermined or determined dynamically. In one or more embodiments, the online concierge system 102 may determine dynamically a bin size based on a targeted output number (targeted sample size). For example, the sampling process 800 may target a particular number of records (e.g., 2000 records) that should be outputted for evaluation. The online concierge system 102 may sample the historical query records using a bin size that generates a targeted sample size. In one or more embodiments, the online concierge system 102 may determine the bin size based on the targeted output using a binary search technique.

By way of example, the online concierge system 102 may calculate appropriate bin size b to yield a targeted sample size M equal to the desired number of record outputs from a query log of volume V (e.g., the total number of historical query records in a given group, such as the non-singleton group). The online concierge system 102 may use binary search to find the value of b that yields the closest sample to M. In one or more embodiments, the online concierge system 102 may divide b values into two halves on either side of value=[(#distinct queries−1)−1]/2. If M is too low, the online concierge system 102 may select b in the middle of the lower half. If M is too high, the online concierge system 102 may select b in the middle of the upper half. The binary search may be repeated iteratively until the online concierge system 102 finds the largest b that is a power of 2 and satisfies b=V/M. The number of records in each bin may be roughly equal to the numbers in other bins.

In some embodiments, the bin sizes may vary depending on the types of search records. For example, the online concierge system 102 determines a threshold for singleton queries. As discussed, a singleton query may refer to a query with a search phrase whose search frequency is lower than (or equal to) the threshold. The online concierge system 102 determines a first bin size for non-singleton queries, such as based on the binary search discussed above. The online concierge system 102 determines a second bin size for the singleton queries. The second bin size can be the same or different from the first bin size. The determination of the bin size for the singleton queries may be based on another algorithm. For example, the online concierge system 102 may recompute the bin size $b_s$ for singleton queries. The online concierge system 102 may define another tunable parameter called a singleton ratio. In one or more embodiments, the singleton ratio, beta, may be defined as the ratio of the singleton volume to the overall query volume (V). This parameter may be changed to reduce the bias of sampling towards the singleton group or towards the non-singleton group. The bin size $b_s$ for singleton queries may be calculated as =(1−beta)(Q−Q')/(beta*V'). In this equation, Q is the number of distinct queries in the overall query log. Q' is the number of distinct queries in the query log so far. V is the total query log volume and V' is the total query log volume so far.

The online concierge system 102 stratifies the set of historical query records according to the first bin size and the second bin size. In some embodiments, the first bin size is larger than the second bin size. In some embodiments, the ratio of the first bin size to the second bin size corresponds to the ratio of a first number of the non-singleton queries in the set of historical query records to a second number of the singleton queries in the set of historical query records.

Figure 9:
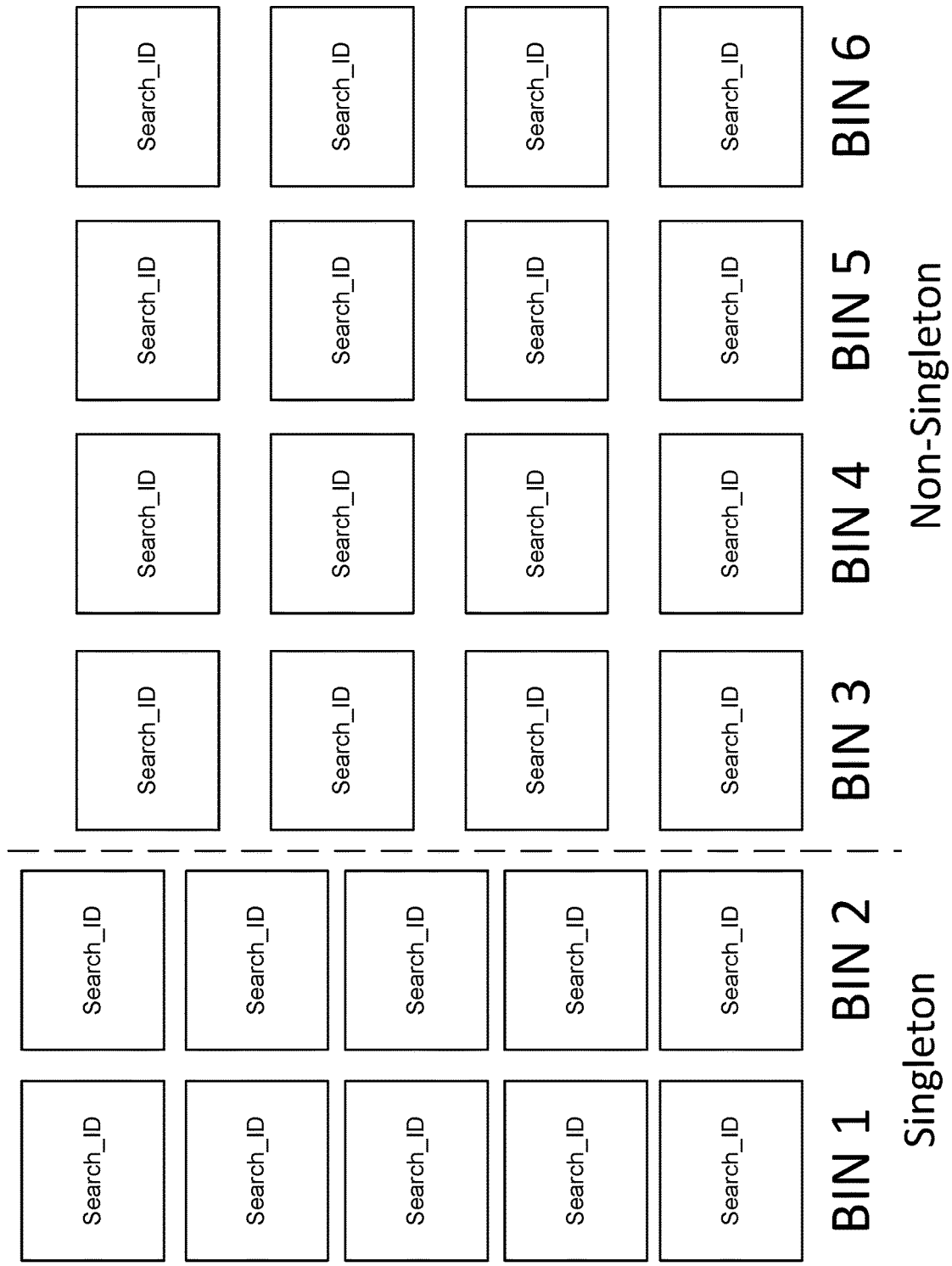
FIG. 9 is a graphical illustration of stratifying the historical query records into different bins, according to one or more embodiments.

FIG. 9 is a graphical illustration of stratifying the historical query records into different bins, according to one or more embodiments. The actual number of bins and the number of records in each bin are examples only and are simplified from an actual example. In the example illustrated in FIG. 9, the singleton records may have a smaller bin size (e.g., a smaller number of bins) but each bin may hold more historical query records. The non-singleton records may have a higher bin size but each bin may hold fewer historical query records. Each bin may have an equal or a similar number of records. The historical query records are sorted by the search frequencies of the search phrases associated with the records, with the leftmost records having the lowest search frequencies and the rightmost records having the highest search frequencies.

The online concierge system 102 samples 840 the historical query records from the plurality of bins to collect a representative set of historical query records. For example, the representative set of historical query records may be sampled evenly from each bin (1 sample per bin, N sample per bin). In some embodiments, the sampling may also be done unevenly for some of the bins, depending on the selection criteria. In some embodiments, to get the next incremental sample, the online concierge system 102 may double the sample size M and recompute the sample using the above steps in the process 800. By using the same random seed, half of the sample in the existing pool is the same as the previous sample. This creates an incremental sampling. The representative set is the sampled result and may be used for further evaluation.

In some embodiments, the online concierge system 102 may also select 850 items for each historical query record in the representative set. In some embodiments, the online concierge system 102 may not further select items in the item results. For example, referring briefly back to FIG. 7, the sampled historical query record may include all of the items in the ranked item results. In other embodiments, the online concierge system 102 may further select 850 items for each historical query record in the representative set. Selecting items for a historical query record may be based on different rules, depending on the nature of the items and the number of items in the query result. For example, the online concierge system 102 may use a first rule for selecting sponsored items and a second rule for selecting non-sponsored items. The first and second rules may be different. For example, the online concierge system 102 may select only the top items for the sponsored items whereas the online concierge system 102 may select additional items from top N items for the non-sponsored items. If the total number of items recorded in the returned query result is lower than a number, all of the items may be selected.

In some embodiments, the online concierge system 102 outputs 860 the representative set of historical query records for the rating of the historical query records. For example, the online concierge system 102 may output 860 the representative set to another engine of the online concierge system 102 to automatically rate the historical query records. In some embodiments, the online concierge system 102 may output 860 the representative set to a third party rater through an API. Examples of how the historical query records may be rated and may be used for model training are discussed in FIG. 6 in association with elements 640 and 650.

Various embodiments allow online systems, such as large-scale database systems, to improve the accuracy of the performance evaluation of their search query engines and training of the search query engines. For example, during the normal course of operation of a search query engine, certain common search phrases are often present more frequently than other search phrases. Without a proper strategy of sampling, the sampled results are often focused on the common search phrases. As a result, the performance evaluation of a search query engine and the corresponding training may bias towards the common search phrases. The bias may adversely affect the performance of the query engine in generating results for more uncommon search phrases as those uncommon search phrases may be underrepresented in the sampled results. The embodiments described address this challenge and provide more balanced sampling approaches in evaluating and training query engines.

Various unbiased sampling processes in accordance with one or more embodiments also improve the speed of training of query engines. A biased sampling approach that focuses on common search phrases generates a training set that is skewed towards certain search phrases. This could result in difficulty in reaching convergence of the machine learning model because the training of the machine learning model using a biased training set could result in the model not being able to reach the convergent state. The improvement in the speed of training using an unbiased sampling process in accordance with one or more embodiments results in more efficient usage of computing resources, reduced processor usage and processing time, reduced consumption of network bandwidth and memory usage, and reduction of power consumption.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
at a computer system comprising at least one processor and memory:
receiving a plurality of search queries from a plurality of users directed at an item query engine of an online system, each search query including a search phrase used by a user to conduct the search query;
generating a training set comprising a plurality of training samples, the plurality of training samples comprising a plurality of search phrases, each training sample corresponding to a search query of the item query engine and comprising a search phrase and a list of items returned by the item query engine;
generating a representative set of training samples, wherein generating the representative set of training samples comprises:
determining search frequencies of the search phrases used in the training samples,
stratifying the set of training samples into a plurality of bins according to the search frequencies of the search phrases, wherein each bin of the plurality of bins includes a subset of training samples, wherein each bin defines a range of numbers of times a search phrase is used by the plurality of users, and sampling the training samples from the plurality of bins to collect the representative set of training samples; and training the item query engine using the representative set of training samples.

2. The method of claim 1, wherein training the item query engine using the representative set of training samples comprises:

initiating a plurality of parameters of the item query engine and a loss function;

applying the item query engine to the training samples to generate predictions of labels of the training samples;

comparing the predictions of labels of the training samples to the training labels of the training samples based on the loss function; and backpropagating the loss function to adjust the plurality of parameters of the item query engine.

3. The method of claim 1, wherein generating the training set comprises:

retrieving, for a training sample, the list of items returned by the item query engine;

generating, for each item in list in the training sample, an item embedding based on product data corresponding to the item; and storing item embeddings corresponding to the list of items as part of the training sample.

4. The method of claim 1, wherein generating the training set comprises:

retrieving, for a training sample, the user who conducted the search query;

generating, for the user in the training sample, a user embedding based on user data that comprises a user profile and a historical purchase; and storing the user embedding as part of the training sample.

5. The method of claim 1, wherein generating the training set comprises:

generating, for a training sample, a user embedding corresponding the user who conducted the search query;

generating, for an item in the training sample, an item embedding based on product data; and generating, for the training sample, an anchor embedding based on the search query and the user embedding; and generating an item score for the item based on comparing the anchor embedding and the item embedding.

6. The method of claim 1, wherein generating the training set comprises:

monitoring the item query engine for a period of time;

storing the plurality of search queries received within the period of time as a set of historical query records; and determining the search frequencies of the search phrases in the set of historical query records, wherein a search frequency for a given search phrase is a number of times the given search phrase used by the plurality of users within the period of time.

7. The method of claim 1, further comprising:

assigning a quality metric value to each of the training samples in the representative set, resulting in a plurality of quality metric values; and using the representative set and the plurality of quality metric values to train a machine learning model in the item query engine.

8. The method of claim 1, further comprising:

dynamically determining a bin size for the plurality of bins through a binary search, wherein sampling the training samples generates a predetermined number of historical query records.

9. The method of claim 1, wherein stratifying the set of training samples into a plurality of bins comprises:

determining a threshold for singleton queries, wherein a singleton query is a query with a search phrase whose search frequency is lower than the threshold;

determining a first bin size for non-singleton queries;

determining a second bin size for the singleton queries, wherein the second bin size is different from the first bin size; and stratifying the set of training samples according to the first bin size and the second bin size.

10. A non-transitory computer-readable medium configured to store code comprising instructions, wherein the instructions, when executed by one or more processors, cause the one or more processors to:

receive a plurality of search queries from a plurality of users directed at an item query engine of an online system, each search query including a search phrase used by a user to conduct the search query;

generate a training set comprising a plurality of training samples, the plurality of training samples comprising a plurality of search phrases, each training sample corresponding to a search query of the item query engine and comprising a search phrase and a list of items returned by the item query engine;

generate a representative set of training samples, wherein generating the representative set of training samples comprises:

determining search frequencies of the search phrases used in the training samples, stratifying the set of training samples into a plurality of bins according to the search frequencies of the search phrases, wherein each bin of the plurality of bins includes a subset of training samples, wherein each bin defines a range of numbers of times a search phrase is used by the plurality of users, and sampling the training samples from the plurality of bins to collect the representative set of training samples; and training the item query engine using the representative set of training samples.

11. The non-transitory computer-readable medium of claim 10, wherein the instruction to train the item query engine using the representative set of training samples comprises instructions to:

initiate a plurality of parameters of the item query engine and a loss function;

apply the item query engine to the training samples to generate predictions of labels of the training samples;

compare the predictions of labels of the training samples to the training labels of the training samples based on the loss function; and backpropagate the loss function to adjust the plurality of parameters of the item query engine.

12. The non-transitory computer-readable medium of claim 10, wherein the instruction to generate the training set comprises instructions to:

retrieve, for a training sample, the list of items returned by the item query engine;

generate, for each item in list in the training sample, an item embedding based on product data corresponding to the item; and store item embeddings corresponding to the list of items as part of the training sample.

13. The non-transitory computer-readable medium of claim 10, wherein the instruction to generate the training set comprises instructions to:
retrieve, for a training sample, the user who conducted the search query;
generate, for the user in the training sample, a user embedding based on user data that comprises instructions to a user profile and a historical purchase; and
store the user embedding as part of the training sample.

14. The non-transitory computer-readable medium of claim 10, wherein the instruction to generate the training set comprises instructions to:
generate, for a training sample, a user embedding corresponding the user who conducted the search query;
generate, for an item in the training sample, an item embedding based on product data; and
generate, for the training sample, an anchor embedding based on the search query and the user embedding; and
generate an item score for the item based on comparing the anchor embedding and the item embedding.

15. The non-transitory computer-readable medium of claim 10, wherein the instruction to generate the training set comprises instructions to:
monitor the item query engine for a period of time;
store the plurality of search queries received within the period of time as a set of historical query records; and
determine the search frequencies of the search phrases in the set of historical query records, wherein a search frequency for a given search phrase is a number of times the given search phrase used by the plurality of users within the period of time.

16. The non-transitory computer-readable medium of claim 10, wherein the instructions, when executed, further cause the one or more processors to:
assign a quality metric value to each of the training samples in the representative set, resulting in a plurality of quality metric values; and
use the representative set and the plurality of quality metric values to train a machine learning model in the item query engine.

17. The non-transitory computer-readable medium of claim 10, wherein the instructions, when executed, further cause the one or more processors to:
dynamically determine a bin size for the plurality of bins through a binary search,
wherein sampling the training samples generates a predetermined number of historical query records.

18. The non-transitory computer-readable medium of claim 10, wherein the instruction to stratify the set of training samples into a plurality of bins comprises instructions to:
determine a threshold for singleton queries, wherein a singleton query is a query with a search phrase whose search frequency is lower than the threshold;
determine a first bin size for non-singleton queries;
determine a second bin size for the singleton queries, wherein the second bin size is different from the first bin size; and
stratify the set of training samples according to the first bin size and the second bin size.

19. A system comprising:
one or more processors; and
memory configured to store code comprising instructions, wherein the instructions, when
executed by the one or more processors, cause the one or more processors to:
receive a plurality of search queries from a plurality of users directed at an item query engine of an online system, each search query including a search phrase used by a user to conduct the search query;
generate a training set comprising a plurality of training samples, the plurality of training samples comprising a plurality of search phrases, each training sample corresponding to a search query of the item query engine and comprising a search phrase and a list of items returned by the item query engine;
generate a representative set of training samples, wherein generating the representative set of training samples comprises:
determining search frequencies of the search phrases used in the training samples,
stratifying the set of training samples into a plurality of bins according to the search frequencies of the search phrases, wherein each bin of the plurality of bins includes a subset of training samples, wherein each bin defines a range of numbers of times a search phrase is used by the plurality of users, and
sampling the training samples from the plurality of bins to collect the representative set of training samples; and
training the item query engine using the representative set of training samples.

20. The system of claim 19, wherein the instruction to train the item query engine using the representative set of training samples comprises instructions to:
initiate a plurality of parameters of the item query engine and a loss function;
apply the item query engine to the training samples to generate predictions of labels of the training samples;
compare the predictions of labels of the training samples to the training labels of the training samples based on the loss function; and
backpropagate the loss function to adjust the plurality of parameters of the item query engine.

* * * * *